Oct. 20, 1959
D. G. FAWKES
2,909,079
VALVE OPERATOR
Filed Feb. 11, 1957
3 Sheets-Sheet 1
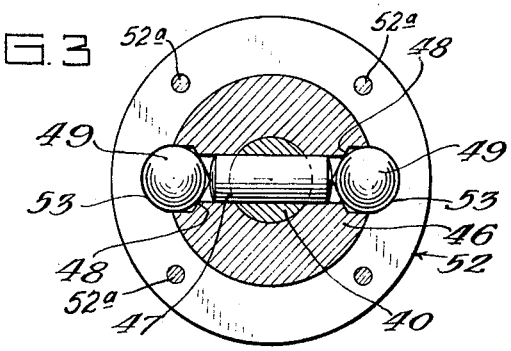
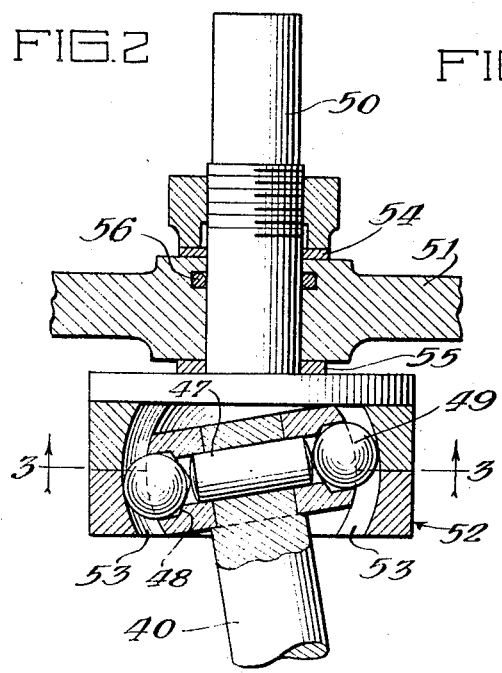
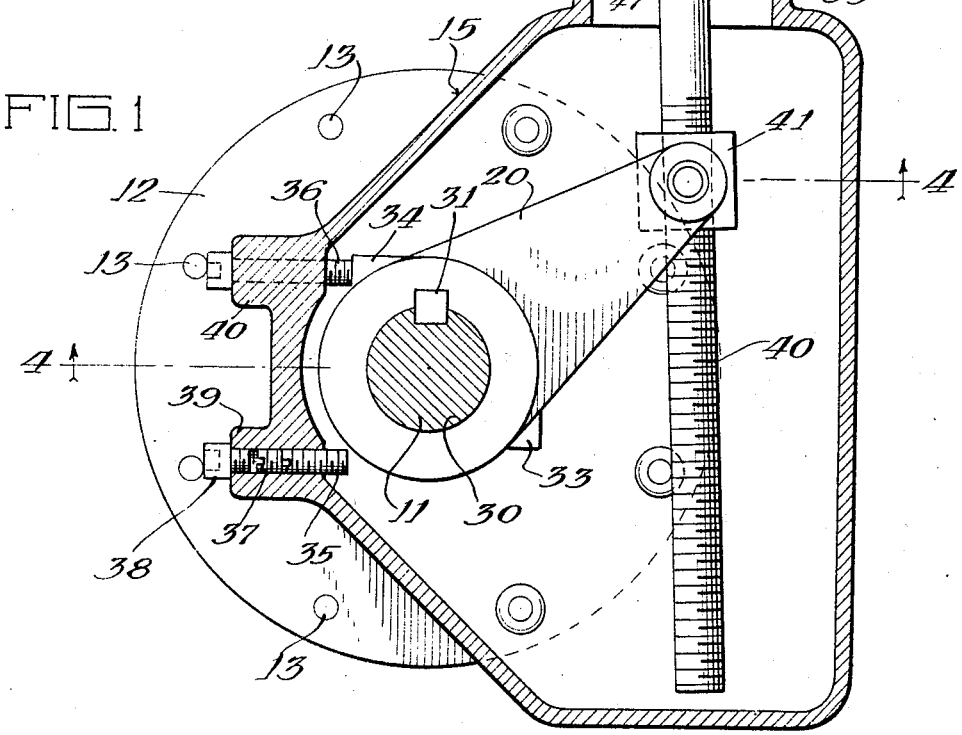
Inventor:
Donald G. Fawkes
By: Schroeder, Hofgren,
Brady & Wegner
Attorneys Oct. 20, 1959  D. G. FAWKES  2,909,079
VALVE OPERATOR Filed Feb. 11, 1957  3 Sheets-Sheet 2

Inventor:
Donald G. Fawkes
By: Schroeder, Hofgren,
Brady & Wegner
Attorneys

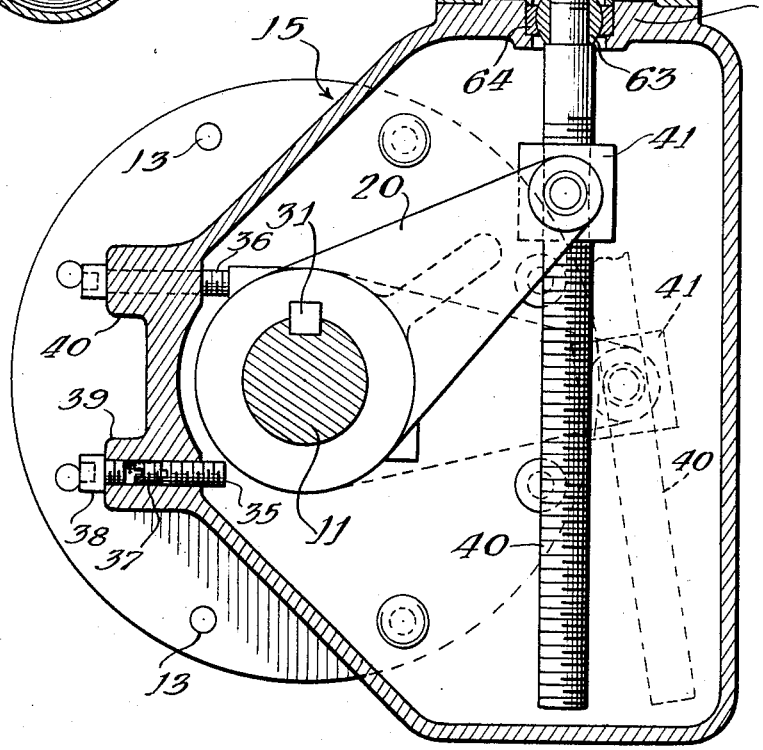

United States Patent Office 2,909,079
Patented Oct. 20, 1959

2,909,079

VALVE OPERATOR

Donald G. Fawkes, Chicago, Ill., assignor to Henry Pratt Company, a corporation of Illinois Application February 11, 1957, Serial No. 639,250

2 Claims. (Cl. 74—509)

This invention relates to a valve operator and more particularly to a mechanical device for translating rotary motion to a crank used to turn a rotary valve stem.

Various mechanical linkages and power transmitting devices have been used to open and close valves which have a rotary stem such as, butterfly, ball, rotary or spherical valves. Such valves generally require about 90° of movement from fully closed to fully opened positions. One of the difficulties with such prior devices has been a tendency toward excessive wear of the parts unless the operator were made of a number of parts and bearings which materially increased its cost. Ordinarily, the previous operators had to be placed in accessible locations for servicing. This also limited their usefulness. In some valves, the operators were not sufficiently tight in their mating parts to avoid fluttering of a valve closure element such as the disc of a butterfly valve which tends to flutter in the fluid flow stream.

It is the primary object of this invention to provide a new and improved valve operator not subject to the difficulties mentioned above.

Another object is to provide a unit which is stable for holding a valve rotor in any position to which it may be adjusted.

Another object is to provide a valve operator which is completely enclosed so that it may be packed with lubricant and placed in any desirable location with the input shaft thereof positioned on a fixed axis.

Figure 4:
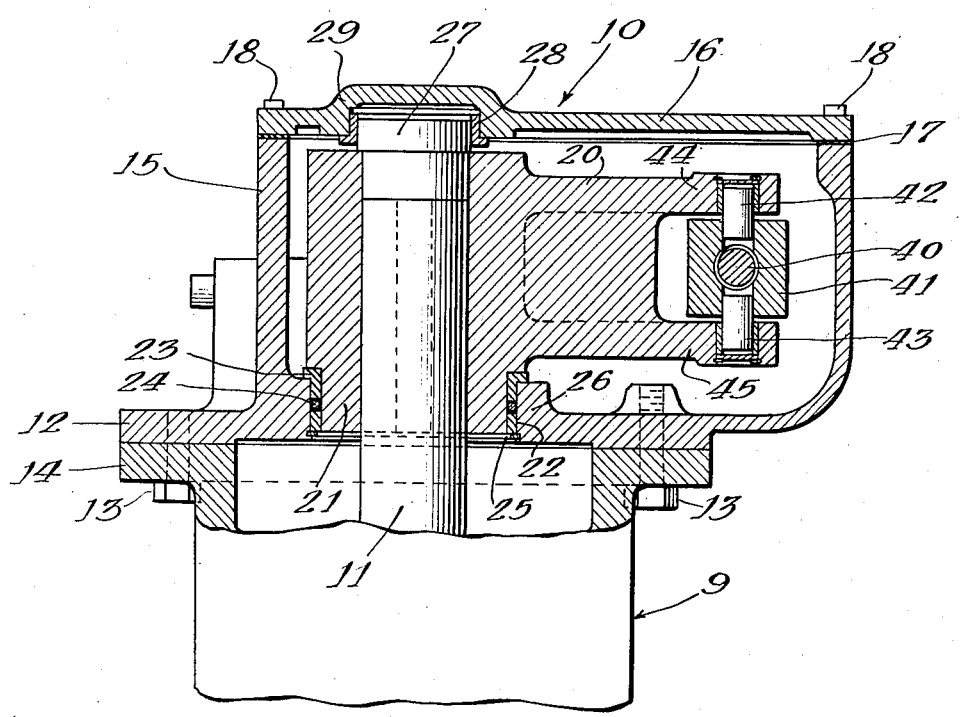
Figure 5:
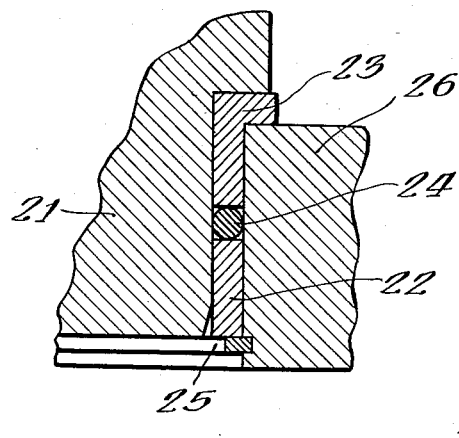

Further objects, features and advantages of the present invention will be apparent from the following description of embodiments illustrated in the accompanying drawings in which;

Figure 1 is a top plan view of a preferred form of the operator with the top removed to show the inner workings, Figure 2 is a fragmentary enlarged plan view partially in section through the connection between the shafts as illustrated in Figure 1, Figure 3 is a sectional view through the shaft's connection taken substantially along line 3—3 in Figure 2, Figure 4 is a vertical sectional view through the operator taken substantially along line 4—4 in Figure 1, Figure 5 is a fragmentary enlarged sectional view through the lower seal element about the crank, Figure 6 is a view similar to Figure 1 of a modified form of the invention, Figure 7 is a sectional view taken substantially along line 7—7 in Figure 6, and Figure 8 is a sectional view taken substantially along line 8—8 in Figure 6.

The valve operator of this invention is intended for use with a valve requiring about 90° of rotary movement of its stem to open and close the valve. The operator is intended to sit upon the valve bonnet and be connected with the valve stem. The operator has an input shaft which may be turned by hand or with a suitable motor in order to move a crank within the operator which is connected to the valve shaft.

In Figure 4, a bonnet extension 9 is fragmentarily shown for mounting the valve operator generally indicated 10 so that it connects with the stem 11 of the valve. As indicated in Figure 1, the valve operator has a lower flange 12 provided with bolt openings 13 for securing it to the flange 14 on the extension 9. One such bolt 13' is shown in Figure 4.

The operator itself comprises a housing 15 which is integrally cast or formed with the flange 12 and is otherwise upwardly open. A top closure 16 is sealed to the walls with a gasket 17 by appropriate bolts 18. By sealing the top 16 to the side walls of the housing, the unit may be filled at the factory with an appropriate lubricant which should remain within the housing throughout a long service life.

The valve stem 11 is caused to move through 90° of rotation by a crank 20 supported within the housing. The lower portion 21 of the crank is provided with a pair of bearing sleeves 22 and 23 separated by an O-ring seal 24 as best illustrated in Figure 5. A snap ring 25 holds the bearings in place within the enlargement 26 formed in the housing. The upper end of the crank is rotatably supported by a stub shaft 27 mounted in a bearing sleeve 28 carried in the boss 29 formed in the cover 16. In this manner the crank is rotatably supported within the housing. A central opening 30 in the crank is provided for securing the crank as by a key 31 to the valve shaft. Ordinarily, the crank will be made in one size for a number of different valve shafts. A sleeve may be provided as an adapter so that the one size of crank may be connected to several valve shafts. It is also contemplated that a spline may be used wherever desirable.

One feature of the present invention is the ease with which the throw of the crank may be adjusted. The crank is formed with a pair of stops 33 and 34 which may abut against adjustable screw stops 35 and 36. These stops employ an inner screw, a lock screw 37 and an outer exposed cap 38 all threaded within bosses 39 and 40 formed in the housing.

A simple mechanical means is provided for turning the crank. In the present instance a threaded shaft 40 is swingable within the housing so that a threaded nut 41 riding and traveling on the shaft may move the crank 20. As seen in Figure 4, the nut is provided with an upper pin 42 and a lower pin 43 received respectively in the bifurcated crank arm, specifically upper and lower portions 44 and 45. Bearings of sleeve form are pressed into the crank portions for receiving the pins. Thus, no movement of a play nature is provided in the unit and any rotary motion of the swinging shaft 40 will produce turning motion of the crank.

The preferred means of driving and supporting the swinging shaft 40 is shown in Figures 1, 2 and 3. A round cap 46 having a spherically formed outer surface is secured to the shaft 40 by a pin 47 with the cap being provided with two arcuate depressions or grooves 48, spaced diametrically opposite, each for receiving a ball bearing 49. The input shaft 50 supported in an extension 51 of the housing carries at its end a two (2) piece unit 52 having spherical formed races 53 receiving the balls 49 and making a universal connection between the shafts. Unit 52 is held together by fasteners 52a. Thrust rings 54 and 55 insure that the shaft 50 does not move relative to the housing. An O-ring seal 55 prevents leakage along the shaft.

The one important feature of the present operator is that the shaft 50 is on a fixed axis and thus many types of motor operators may be used interchangeably. The universal connection prevents any play movement of the swinging shaft and absorbs the thrust along the length of the shaft 40. Thus, the valve closure may be subject to considerable flutter producing forces but the operator will hold the valve closure against such movement, particularly since higher axial loads can be sustained by this particular joint than conventional types of universal joints.

The form of the invention illustrated in Figures 6 through 8 employs the same shaft 40 and traveling nut 41 operating the crank 20. The housing is also similarly formed except for the extension 51. The extension 61 is bolted to the housing by flange 62 shown in Figure 6. A spherical bearing 63 is mounted in "Oilite" bearings 64 to provide for the swinging movement of the shaft 40. These bearings are suitably held in an enlargement 65 in the housing. The input shaft 50 is held on a fixed axis and an intermediate stub 66 permits the shaft 40 to swing. The shaft 66 is provided with pins 67 and 68 at its opposite ends respectively received in slots in connectors 69 and 70 to permit the universal movement necessary. In other respects, the operator is similar in operation and results to the operator illustrated in Figure 1. The spherical bearing takes up the thrust from the shaft 40 permitting no play movement in the valve shaft. It should be understood that appropriate seal and bearing supports are provided throughout the spherical bearings and its associated parts.

The present operator provides a solid, stable unit throughout the relatively movable parts thereof so that a valve with which it is used may be accurately and easily adjusted. The fixed input shaft permits the operator to be placed relative to a motor without regard to necessary movement of a motor. Since the unit is sealed and packed with lubricant, it may be used underground or submerged if necessary.

The foregoing detailed description has been given for clearness of understanding only, and no unnecessary limitations should be understood therefrom, for some modifications will be obvious to those skilled in the art.

I claim:

1. An operator for a butterfly valve having a closure disc secured to a valve stem, comprising: a sealed housing for mounting upon the valve in a position with the valve stem extending into the housing; a crank swingably mounted in the housing and having a hollow hub receiving the valve stem; a threaded shaft extending beside the crank and having threads over a length thereof corresponding to about 90° movement of the crank; a nut member pivotally secured to the end of the crank opposite said hub and mounted upon the threaded shaft for linear movement therealong in response to shaft rotation; a universal thrust bearing support for one end of the threaded shaft permitting swinging movement of the shaft during travel of the nut member therealong to swing the crank in an arc; and a drive shaft supported for rotation about a fixed axis and having a universal drive connection with the threaded shaft for turning the latter, said bearings and shafts providing for holding the crank against play movement so as to hold the valve in selected position.

2. An operator for turning a rotary valve stem, comprising: a housing; a crank pivotally mounted in the housing and having a hollow hub for connection to the valve stem to be turned; a threaded shaft in the housing having a thrust bearing supporting one end; a traveling member pivotally secured to the crank and mounted on the threaded shaft for linear movement therealong responsive to rotation of the shaft, said thrust bearing permitting swinging of the threaded shaft to accommodate turning of the crank and holding the crank and shaft against play movement; and a drive shaft mounted for rotary movement about a fixed axis relative to the housing and connected to the threaded shaft for rotating the latter as desired, said drive shaft being supported in the housing for limiting movement of said shaft to rotate about said fixed axis and carrying a bearing member on its inner end, said bearing member having spaced arcuate raceways oriented generally longitudinally of said shaft axis with a common center on the axis, said threaded shaft having a cooperating head carrying ball bearings for movement in said raceways during rotation of the the shafts whereby said drive shaft and crank provide the sole support for said threaded shaft.

References Cited in the file of this patent

UNITED STATES PATENTS

| 1,423,008 | Morton | July 18, 1922 |
| 1,463,306 | Bushnell | July 31, 1923 |
| 2,104,151 | Brisbane et al. | Jan. 4, 1938 |
| 2,406,343 | Beardsley | Aug. 27, 1946 |
| 2,452,428 | Bryant | Oct. 26, 1948 |
| 2,548,994 | Miller et al. | Apr. 17, 1951 |

FOREIGN PATENTS

| 443,756 | France | July 22, 1912 |
| 259,110 | Italy | June 15, 1928 |
| 413,583 | Italy | May 20, 1946 |